Figure 1:
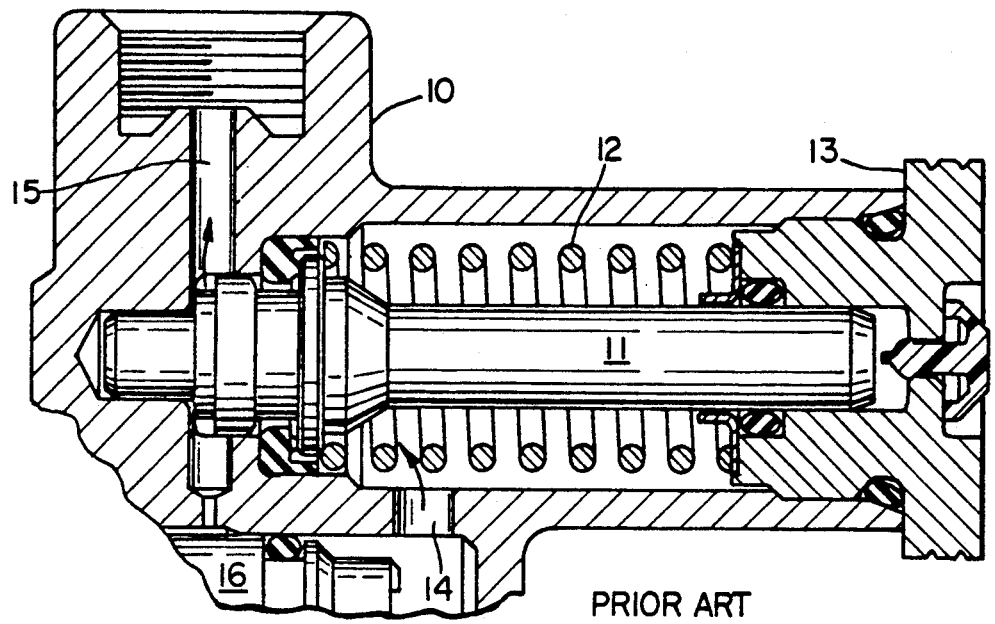

United States Patent
Crumb

[11] Patent Number: 5,144,976
[45] Date of Patent: Sep. 8, 1992

[54] VENTED SCREW-IN PROPORTIONING VALVE

[75] Inventor: Donald A. Crumb, Granger, Ind.

[73] Assignee: Allied-Signal Inc., Morristown, N.J.

[21] Appl. No.: 751,428

[22] Filed: Aug. 28, 1991

[51] Int. Cl.[5] .............................................. F16K 17/04
[52] U.S. Cl. .................................... 137/509; 303/9.72
[58] Field of Search .................... 137/509, 493, 493.9; 303/9.62, 9.75

[56] References Cited

U.S. PATENT DOCUMENTS

| 4,000,684 | 1/1977 | Ruffley | 137/509 X |
| 4,893,878 | 1/1990 | Cole et al. | 303/9.75 |
| 4,957,140 | 9/1990 | Ishiwata | 137/505.25 |

FOREIGN PATENT DOCUMENTS

| 1076996 | 3/1960 | Fed. Rep. of Germany | 137/509 |
| 47-19452 | 6/1972 | Japan | 303/9.62 |
| 2131107 | 6/1984 | United Kingdom | 303/9.75 |

*Primary Examiner*—Stephen M. Hepperle
*Attorney, Agent, or Firm*—Larry J. Palguta; Ken C. Decker

[57] ABSTRACT

The vented screw-in proportioning valve (30) of the present invention comprises a proportioning valve body (32) having threads (36) on the proportioning valve body (32) connected with threads (23) of a master cylinder boss (22). A stepped bore (38) of the proportioning valve body (32) includes a differential area piston which is generally U-shaped, a pair of seal members (52, 54) located axially spaced-apart and disposed about the piston (40) in order to define a vented chamber (60), a vent (62) extending through the proportioning valve body (32) and communicating with the vented chamber (60), a snap ring (70) located adjacent an inlet (34) of the proportioning valve body (32), a retainer (80) spring-biased into engagement with the snap ring (70), a spring (90) disposed between the retainer (80) and an interior cavity (42) of the piston (40) in order to bias the piston (40) toward the outlet (33), and a fluid seal (50) disposed adjacent a head (46) of the piston (40).

12 Claims, 1 Drawing Sheet

U.S. Patent  Sep. 8, 1992  5,144,976

VENTED SCREW-IN PROPORTIONING VALVE

The present invention relates generally to a proportioning valve, and in particular to a vented screw-in proportioning valve.

Many proportioning valve designs are located within a valve body that is entirely separate from the master cylinder. It is advantageous to provide a proportioning valve as a screw-in proportioning valve mounted directly to the master cylinder body at an outlet for the rear brakes. This can contribute to eliminating the utilization of a separate body for the proportioning valve and other devices such as a fluid pressure failure warning switch mechanism which may also be incorporated into the body of the master cylinder. Some screw-in valves such as those illustrated in U.S. Pat. Nos. 4,893,878 and 4,957,140 utilize a poppet which necessitates the use of relatively small holes for fluid flow. This can result in poor valve performance at various apply rates and temperatures. Also, because of the small piston and seat diameters used in a poppet type valve, friction variation has a greater affect on the pressure tolerance at the knee point of the desired pressure curve.

The vented screw-in proportioning valve of the present invention provides solutions to the above problems by providing a vented screw-in proportioning valve, comprising a proportioning valve body having at one end an outlet and at an opposite end an inlet, threads at the opposite end for mounting said proportioning valve body, a stepped bore extending through said proportioning valve body so said inlet communicates with said outlet, a differential area piston disposed within said bore, the piston being generally U-shaped and having a plurality of radially extending fluid flow apertures communicating with an interior cavity in said piston, fluid seal means located within said stepped bore and located adjacent an end of said piston, axially spaced-apart seal members located in stepped bore and disposed about said piston to define a vented chamber, vent means extending through said proportioning valve body and communicating with said vented chamber, a retainer located within said stepped bore and positioned by abutment means located at said body, and spring means extending within the interior cavity in said piston and engaging the retainer in order to bias said piston toward said outlet.

Figure 2:
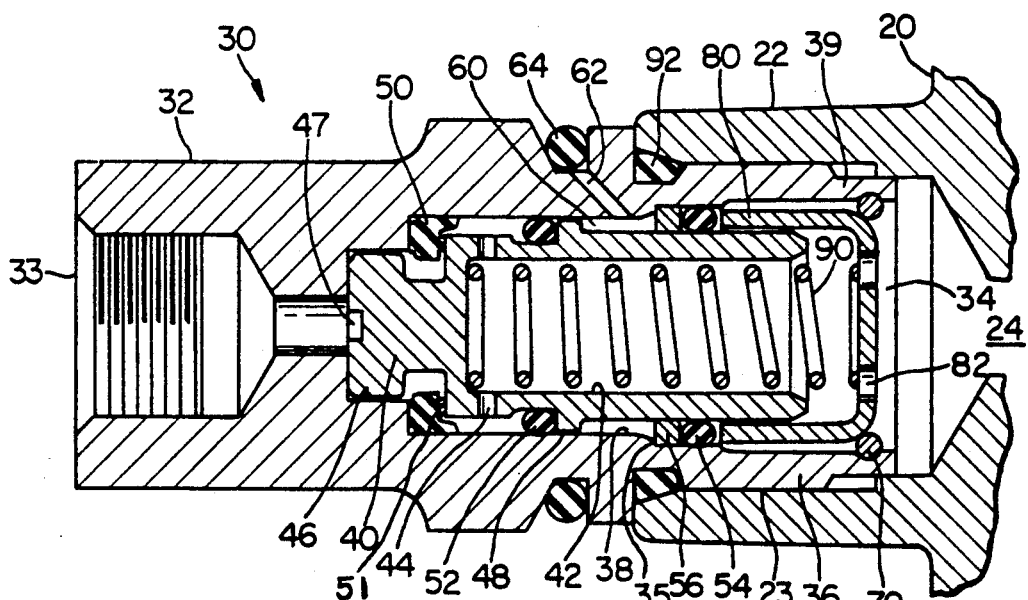

An embodiment of the present invention is illustrated in the following figures in which:

FIG. 1 is a section view of a prior proportioning valve contained in a valve body separate from the master cylinder; and FIG. 2 is a section view of the vented screw-in proportioning valve of the present invention.

FIG. 1 illustrates a proportioning valve contained within a body 10 that is separate from the body of the associated master cylinder Differential area piston 11 is biased by spring 12 seated against screw-in retainer cap or end closure 13. Fluid flow enters through inlet 14 and exits around the head of differential area piston 11 and through outlet 15 and toward the rear brakes of the vehicle. Valve body 10 may also include a partially shown fluid pressure failure warning switch 16 which senses fluid pressure loss in the primary or secondary fluid circuits. It is desirable to provide a proportioning valve which may be attached directly as a unit to an outlet boss of the master cylinder body, thus either eliminating or contributing to eliminating the utilization of body 10 as a separate structure.

Referring to FIG. 2, master cylinder body 20 includes boss 22 having internal thread 23. Body 20 includes outlet 24 which permits the transmission of fluid pressure toward the not shown rear brakes of the vehicle. The vented screw-in proportioning valve of the present invention is designated generally by reference numeral 30. Proportioning valve 30 includes body 32 having outlet 33 and inlet 34 communicating with master cylinder outlet 24. Body 32 includes exterior threads 36 which engage interior threads 23 of master cylinder body 20. Stepped bore 38 extends through the length of body 32 in order to communicate inlet 34 with outlet 33. Differential area piston 40 is located within the stepped bore and comprises a generally U-shaped piston having interior cavity 42 which communicates with fluid flow apertures 44 that permit fluid from outlet 24, inlet 34 to communicate past fluid seal 50 (note lateral rightwardly extending projections 51), about piston head 46 and through transverse slot 47 to outlet 33. Piston 40 includes large diameter portion or outer shoulder 48 which provides a seat for seal member 52 located axially spaced apart from associated seal member 54. Centering ring 56 is located about piston end 47 and seats against valve body shoulder 35. Centering ring 56 provides slidable guidance for piston 40 within stepped bore 38. Seal member 54 seats against centering ring 56. Seal members 52, 54 engage the exterior surface of piston 40 and the surface of stepped bore 38 to define vented chamber 60. Vented chamber 60 communicates with vent 62 that is closed by vent seal 64. Vent seal 64 permits the transmission of air past the seal while at the same time preventing large contaminants such as water, dirt, etc. from entering stepped bore 38. Large diameter portion 48 not only provides the larger area of differential area piston 40, but defines, along with seal member 52, a portion of vented chamber 60. Stepped bore 38 includes at body end 39 a snap ring 70 which provides a seat for retainer 80. Cup-shaped retainer 80 includes a plurality of fluid flow passages 82, provides a seat for spring 90, and retains the seal member 54 in the illustrated axial position. Spring 90 seats at one end against piston head 46 and at the other end against retainer 80. Retainer 80 is spring-biased into position against snap ring 70. Static seal 92 is located about the exterior of valve body 32 and engages the interior of boss 22.

When fluid pressure is transmitted from the master cylinder through outlet 24 to proportioning valve inlet 34 and valve outlet 33, an increase in fluid pressure is effective against shoulder 48, which comprises the largest diameter area of piston 40, to cause piston 40 to be movably responsive to fluid pressure changes. As the fluid Pressure increases to a knee point or break point of the fluid pressure curve, piston 40 will move laterally to the right and permit an increased volume of fluid pressure to be transmitted toward the rear wheels and effect increased braking at the rear portion of the vehicle. Vented screw-in proportioning valve 30 of the present invention provides a valve that is easily mounted to an exterior boss of the master cylinder body so that the fluid pressure for the rear brakes is proportioned at the master cylinder rather than at some remote location. It does not utilize any small poppet types of valves and, thus, changes in fluid pressure apply rates and temperatures do not affect the valve's performance. Because such small parts are not utilized as are typical in poppet valves, friction variation, as from seals etc., does not affect the pressure tolerance at the knee point. The linear alignment of the inlet and outlet of the proportioning valve is a result of the vented chamber being provided at a position orthogonal to the axial centerline of the valve and fluid flowing through the interior cavity and apertures and past the fluid seal.

I claim:

1. A vented screw-in proportioning valve, comprising a proportioning valve body having at one end an outlet and at an opposite end an inlet, threads at the opposite end for mounting said proportioning valve body, a stepped bore extending through said proportioning valve body so said inlet communicates with said outlet, a differential area piston disposed within said bore, the piston being generally U-shaped in cross section and having a plurality of radially extending fluid flow apertures communicating with an interior cavity in said piston, fluid seal means located within said stepped bore and located adjacent an end of said piston, axially spaced-apart seal members located in the stepped bore and disposed about said piston to define a vented chamber, vent means extending through said proportioning valve body and communicating with said vented chamber, a retainer located within said stepped bore and positioned by abutment means located at said body, and spring means extending within the interior cavity in said piston and engaging the retainer in order to bias said piston toward said outlet, the retainer being biased by said spring into engagement with the abutment means and the abutment means comprising a snap ring.

2. The vented screw-in proportioning valve in accordance with claim 1, wherein the retainer includes a plurality of through passages for fluid flow.

3. A vented screw-in proportioning valve, comprising a proportioning valve body having at one end an outlet and at an opposite end an inlet, threads at the opposite end for mounting said proportioning valve body, a stepped bore extending through said proportioning valve body so said inlet communicates with said outlet, a differential area piston disposed within said bore, the piston being generally U-shaped in cross section and having a plurality of radially extending fluid flow apertures communicating with an interior cavity in said piston, fluid seal means located within said stepped bore and located adjacent an end of said piston, axially spaced-apart seal members located in the stepped bore and disposed about said piston to define a vented chamber, vent means extending through said proportioning valve body and communicating with said vented chamber, a retainer located within said stepped bore and positioned by abutment means located at said body, spring means extending within the interior cavity in said piston and engaging the retainer in order to bias said piston toward said outlet, and a centering ring and one of the seal members disposed about said piston and providing slidable guidance for said piston within said bore, the centering ring and one seal member retained axially in place by the retainer.

4. The vented screw-in proportioning valve in accordance with claim 3, wherein the retainer is biased by said spring means into engagement with the abutment means.

5. The vented screw-in proportioning valve in accordance with claim 4, wherein the abutment means comprises a snap ring.

6. The vented screw-in proportioning valve in accordance with claim 5, wherein the retainer includes a plurality of through passages for fluid flow.

7. The vented screw-in proportioning valve in accordance with claim 3, further comprising a static seal disposed about the proportioning valve body and adjacent the threads.

8. The vented screw-in proportioning valve in accordance with claim 3, further comprising a vent seal located about the proportioning valve body and for keeping contaminants from entering said vent means.

9. The vented screw-in proportioning valve in accordance with claim 3 and in combination with a master cylinder, wherein the threads are disposed about the exterior of said proportioning valve body and engage interior threads of a boss of the master cylinder.

10. The vented screw-in proportioning valve in accordance with claim 3, wherein the piston includes a larger diameter portion which also defines, with the other of said spaced-apart seal members, a portion of the vented chamber.

11. The vented screw-in proportioning valve in accordance with claim 3, wherein the piston includes a head having at least one transverse slot to provide for fluid flow with said outlet.

12. The vented screw-in proportioning valve in accordance with claim 3, wherein the fluid seal means is disposed about the end of said piston to be adjacent thereto, such that fluid flows through the cavity and apertures and past the fluid seal means and end of the piston so that the outlet is aligned linearly with said inlet.

* * * * *